(12) United States Patent
Batosky et al.

(10) Patent No.: US 8,156,838 B2
(45) Date of Patent: Apr. 17, 2012

(54) DRIVING DEVICE

(75) Inventors: Oleg Batosky, Lahnstein (DE); Timo Frieb-Preis, Muenstermaifeld (DE); Jörg Hillen, Noertershausen (DE); Peter Kohns, Vallendar (DE)

(73) Assignee: Stabilus GmbH, Koblenz (DE)

( * ) Notice: Subject to any disclaimer, the term of this patent is extended or adjusted under 35 U.S.C. 154(b) by 335 days.

(21) Appl. No.: 12/369,103

(22) Filed: Feb. 11, 2009

(65) Prior Publication Data
US 2009/0199668 A1    Aug. 13, 2009

(30) Foreign Application Priority Data

Feb. 12, 2008 (DE) .......................... 10 2008 008 743

(51) Int. Cl.
*F16F 1/24* (2006.01)
(52) U.S. Cl. .................................................. 74/424.71
(58) Field of Classification Search .................. 74/89.23, 74/424.71; 49/343, 344; 324/207.2, 723
See application file for complete search history.

(56) References Cited

U.S. PATENT DOCUMENTS

| | | | | |
|---|---|---|---|---|
| 4,468,063 A | * | 8/1984 | Yukimoto et al. | 296/223 |
| 4,642,496 A | * | 2/1987 | Kerviel et al. | 310/68 B |
| 2007/0062119 A1 | * | 3/2007 | Ritter | 49/343 |

* cited by examiner

*Primary Examiner* — Vicky Johnson
(74) *Attorney, Agent, or Firm* — Cozen O'Connor

(57) ABSTRACT

A driving device for a hatch in a motor vehicle includes a first fastening element which can be connected to a stationary structural component, a second fastening element which can be connected to a movable structural component, a spindle drive including a threaded spindle having an axis of rotation and a spindle nut arranged on the threaded spindle, and a rotary drive having a driveshaft for rotating spindle to move the first fastening element axially relative to the second fastening element. A stroke detection sensor for continuously detecting the position of the movable structural component includes a rotatable sensor element driven in rotation by the driveshaft and a stationary sensor element for continuously detecting the rotational position of the rotatable sensor element. A gear reduction unit is provided between the driveshaft and the rotatable sensor element so the revolutions of the sensor element are reduced by about 14:1.

24 Claims, 11 Drawing Sheets

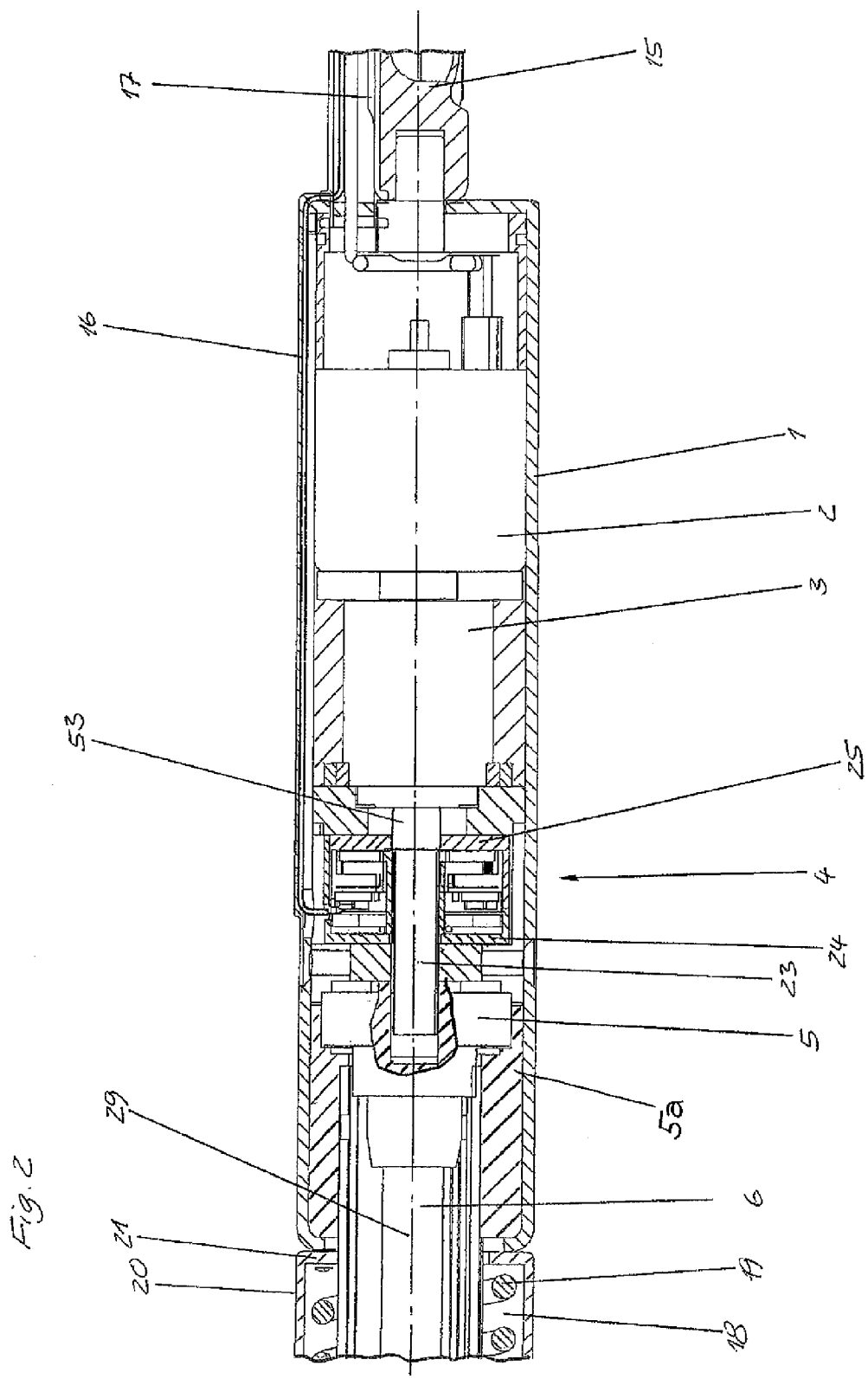

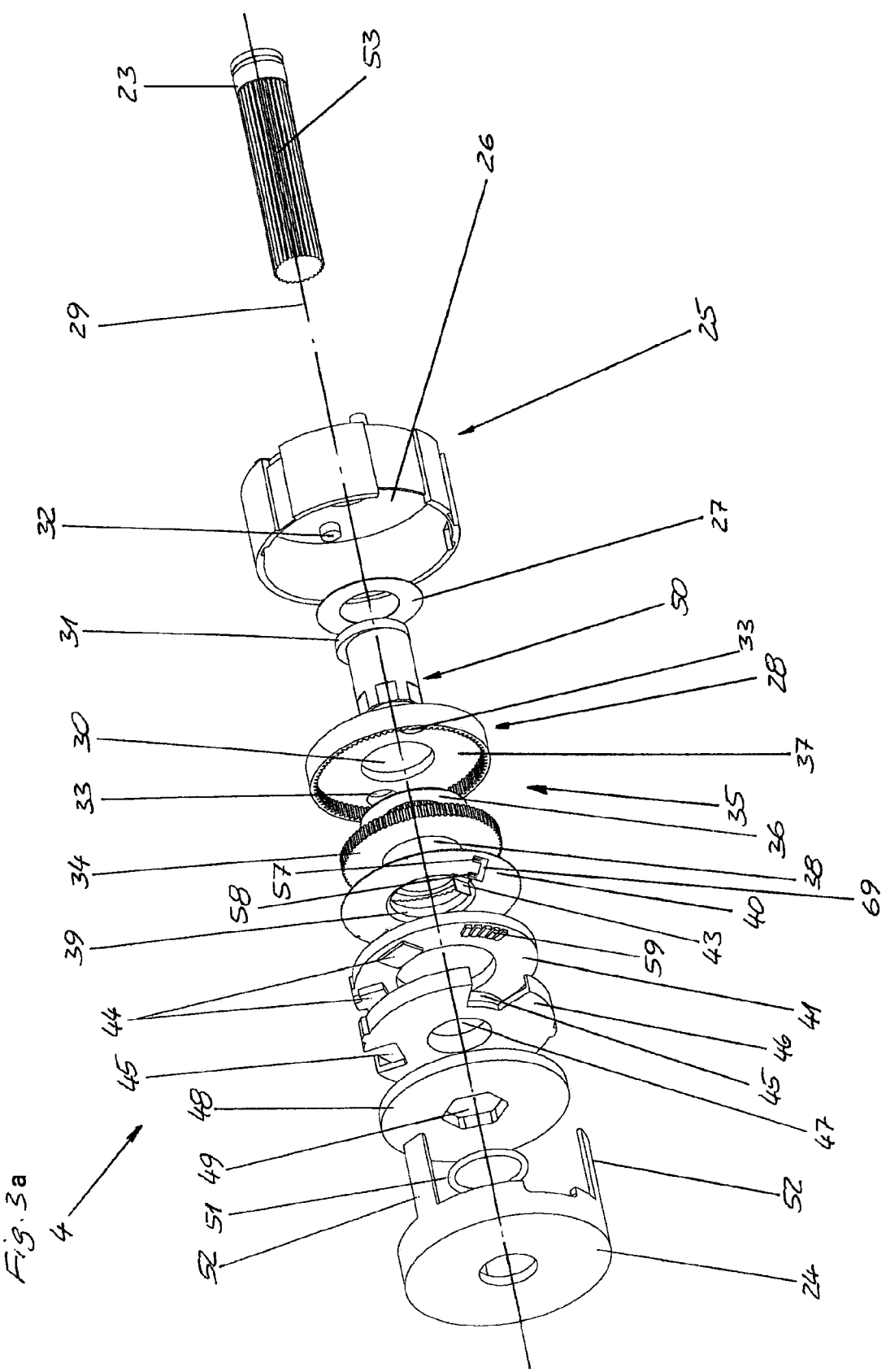

DRIVING DEVICE

BACKGROUND OF THE INVENTION

1. Field of the Invention

The invention relates to a driving device, particularly for a hatch in a motor vehicle, having a first fastening element which can be connected to a stationary structural component, a second fastening element which can be connected to a movable structural component, a spindle drive including a threaded spindle with a spindle nut arranged thereon, a rotary drive with a driveshaft for rotating the spindle to move the first fastening element axially relative to the second fastening element, a stroke detection sensor for detecting the position of the movable structural component, and a spindle sensor for detecting the revolutions of the spindle.

2. Description of the Related Art

In a driving device of the type mentioned above, it is known to detect the stroke position by means of a linear potentiometer and to detect the spindle revolutions by means of a Hall sensor. This construction requires a large installation space and a time-consuming construction.

SUMMARY OF THE INVENTION

It is an object of the invention to provide a driving device of the type mentioned above which has a compact and simple construction.

This object is met according to the invention in that the stroke detection sensor is a continuous rotational position sensor with a stationary sensor element detecting the rotational position and a sensor element which is rotatable corresponding to the rotational position to be detected. The rotatable sensor element can be driven in rotation by the driveshaft by a reduction gear unit.

The continuous stroke detection sensor also makes it possible to detect the actual stroke position of the driving device after an interruption of the power supply. A smaller structural size is made possible owing to its construction as a rotational position sensor.

In order that the rotatable sensor element only carries out a rotational movement of less than 360° at the greatest possible adjusting stroke, this reduction of the rotational movement of the rotatable sensor element is carried out by means of the reduction gear unit.

In a very compact construction, the reduction gear unit has an annular gear, which is fixed with respect to relative rotation and which is drivable in a wobbling manner by an eccentric cam of the driveshaft, and a gear wheel arranged in the annular gear coaxial to the axis of rotation. The gear wheel has a smaller diameter than the inner diameter of the annular gear, engages with the annular gear and is drivable in rotation by the annular gear, the rotatable sensor element being drivable in rotation by the gear wheel.

In a simple manner, the annular gear can have a plurality of axial bore holes into which axially stationary pins having a circular cross section can project so as to allow the annular gear to move around the axis of rotation in a circular path caused by the eccentric cam while at the same time preventing a rotational movement. The diameter of the axial bore holes is greater than the diameter of the pins by twice the amount of the eccentricity of the eccentric cam.

The reduction gear unit is preferably a toothed wheel gear unit.

The closer the number of teeth of the annular gear to that of the wheel and, therefore, the higher the transmission ratio, the more necessary it would be to modify the shape of the teeth. For even higher gear ratios, the reduction gear unit is advantageously a friction gear unit.

Of course, any other suitable type of gear unit such as, e.g., cycloid gear units or harmonic drives can also be used.

The stationary sensor element and the rotatable sensor element can be arranged radially with respect to one another.

However, a small radial structural size results if the stationary sensor element and the rotatable sensor element are arranged axially relative to one another.

When the rotatable sensor element is connected to the wheel by a slip clutch, only a rough adjustment need be carried out with respect to the stationary sensor element for assembly. When first put into operation, the rotatable sensor element can rotate until it contacts a stop which determines the end position of the locking range of the rotatable sensor element relative to the stationary sensor element so that it does not rotate along with the wheel when the latter is rotated further.

The rotatable sensor element and the stationary sensor element are accordingly positioned exactly relative to one another.

In a simple construction, the rotatable sensor element is connected to the wheel so as to be displaceable on a concentric path and has an axially projecting stop which engages in a groove of the stationary sensor element, which groove extends radially along part of the circumference. The ends of the groove are end stops determining the displacement range of the rotatable sensor element relative to the stationary sensor element.

In so doing, the rotatable sensor element is connected to the wheel in a simple manner by frictional engagement.

The rotatable sensor element and the axially projecting stop can be arranged at a carrier so as to economize on structural components and installation space, this carrier having a sleeve which is concentric to the axis of rotation and which is inserted into a coaxial bore hole of the gear wheel in a frictional engagement.

In an advantageous construction, the continuous rotary position sensor is a rotary potentiometer, the rotatable sensor element is a potentiometer wiper, and the stationary sensor element is an annular potentiometer path.

For this purpose, the stationary sensor element can be arranged on a stationary sensor carrier formed as a ring disk.

In order to sense the absolute path in a contactless manner, the continuous rotary position transmitter can also have a magnetoresistive sensor that must be arranged eccentrically.

If a signal is to be generated additionally in a determined rotational position such as preferably in the end position of the rotatable sensor element, a second rotatable sensor element can be drivable in rotation by the driveshaft by means of the reduction gear unit and by means of which a second stationary sensor element can be contacted in a determined rotational position.

When the second rotatable sensor element is arranged at the carrier and the second stationary sensor element is arranged at the sensor carrier, the quantity of structural component parts and the constructional size of the driving device can be reduced through a dual function of the structural component parts.

In a simple construction, the second rotatable sensor element is a wiper contact and the second stationary sensor element is a contact element.

In an alternative embodiment form, the continuous rotary position sensor includes a magnet as a rotatable sensor element and a reed contact as a stationary sensor element.

In another construction, the reed contact is arranged in or at a window in the sensor carrier, and the magnet is arranged at the carrier.

In another alternative embodiment form, the continuous rotary position sensor includes a lug formed at the carrier as a rotatable sensor element and a biased reed contact as a stationary sensor element.

In an advantageous development, the reed contact is arranged in or at a window in the sensor carrier.

The spindle sensor is preferably an angular momentum sensor by which the run-out speed can be detected and which can be used to synchronize with parallel driving devices.

In an advantageous construction, the spindle sensor has one or more stationary Hall sensors, a magnet ring which is fixedly connected to the driveshaft being arranged opposite to the Hall sensor(s). The Hall sensor(s) can be arranged on the sensor carrier.

Depending on the desired accuracy of rotational detection, the magnet ring can be provided with one or more pole pairs.

The magnet ring and Hall sensors can be arranged radially with respect to one another.

When the magnet ring and Hall sensors are arranged axially relative to one another, a small radial constructional size can be achieved.

In an alternative embodiment form, the spindle sensor has one or more stationary Hall sensors, a stationary magnet being arranged opposite to the latter, and a fan-type washer which is fixedly connected to the driveshaft is arranged between the Hall sensors and the magnet.

In another construction, the fan-type washer has recesses and projections influencing the magnetic field of the magnets.

In another alternative embodiment form, the spindle sensor has one or more stationary biased Hall sensors on which a fan-type washer that is fixedly connected to the driveshaft is arranged so as to be located opposite to it.

When the stroke detection sensor, the spindle sensor and the reducing gear unit are arranged so as to form a structural unit in a housing which is penetrated by the driveshaft, this constructional unit can be preassembled so as to facilitate assembly of the driving device.

In this connection, the annular gear, the gear wheel, the carrier, the sensor carrier and the magnet ring can be arranged in a sandwich-type construction with respect to one another in the cup-shaped housing. The housing preferably has a housing cup which can be closed by a housing cover.

The rotary drive is preferably an electric motor, the spindle drive being drivable in rotation by its driveshaft.

For the purpose of decoupling the rotary drive from the spindle drive, the spindle drive can be rotatably driven by the rotary drive by means of a coupling which can be opened.

To reduce speed and increase torque, the spindle drive can be rotatably driven by the rotary drive by means of a gear unit.

A compact construction is achieved when the rotary drive and/or the gear unit are/is fixedly arranged in a housing tube which preferably extends coaxial to the axis of rotation.

A simple construction which can be mounted in any rotational position with respect to the axis of rotation results when one or both of the fastening elements are a spherical head or a ball socket of a ball joint.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 2 shows an enlarged section through the driving device according to FIG. 1 in the area of the sensor unit;

FIG. 3a shows a perspective exploded view of the sensor unit of the driving device according to FIG. 1;

FIG. 3b shows a detail of a structural component part shown in FIG. 3a;

DETAILED DESCRIPTION OF THE PRESENTLY PREFERRED EMBODIMENTS

Figure 1:
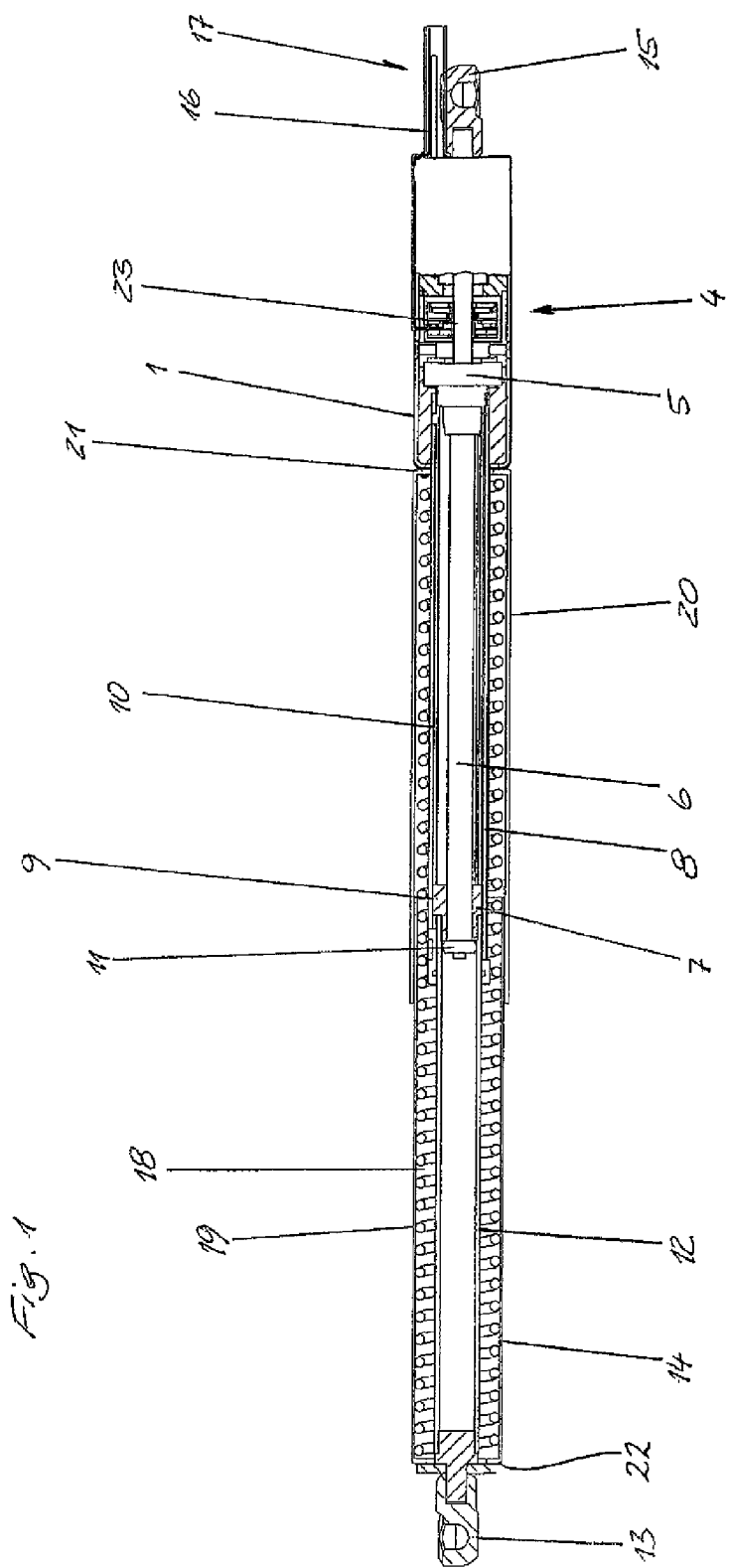
FIG. 1 shows a cross-sectional view of a driving device.

The driving device shown in the drawings has a housing tube 1 in which an electric motor 2, a gear unit 3 which can be driven by the electric motor 2, and a sensor assembly 4 are arranged in series one after the other.

It is also possible to arrange a clutch in the drivetrain, in which case the sensor assembly 4 preferably follows the clutch so that a manual movement of the hatch can also be sensed.

Following the sensor assembly 4 in sequence is a spindle adapter 5 which is supported at a bearing 5a and connected coaxially to a rotatably mounted threaded spindle 6.

A spindle nut 7 is arranged on the threaded spindle 6 so as to be axially displaceable in a guide tube 8 which is fixedly connected coaxially to the housing tube 1.

The spindle nut 7 engages in axial slots 10 at the inner wall of the guide tube 8 by supporting pins 9 which project out radially so that the spindle nut 7 is fixed against rotation relative to the guide tube 8.

The threaded spindle 6 has a guide piece 11 at its free end by which the threaded spindle 6 is guided in a spindle tube 12 so as to be axially displaceable. The spindle tube 12 has the spindle nut 7 fixed in one end and a first ball socket 13 forming a fastening element at its other end remote of the threaded spindle 6.

An outer tube 14 has one end fastened to the spindle tube 12 in the area of the first ball socket 13, and encloses the spindle tube 12 coaxially at a distance. The other end projects into a spring sleeve 20 and is guided therein so as to be axially displaceable. The spring sleeve 20 has at one end a collar 21 which is directed inward radially and by which it contacts the housing tube 1 axially.

Arranged at the end of the housing tube 1 opposite to the first ball socket 13 there is a second ball socket 15 forming a second fastening element and a line feed through 17 for supplying power to the electric motor 2 and for the signal lines 16 which lead from the sensor assembly 4 to the line feedthrough 17 in the housing tube 1.

A helical compression spring 19 is supported by one end at an inwardly directed collar 22 of the outer tube 14 and acts upon the spring sleeve 20 axially against the housing tube 1 by its other end by means of the collar 21. The spring 19 is arranged in the annular space 18 formed between the spindle tube 12 and the guide tube 8 on the inside and the outer tube 14 and spring sleeve 20 on the outside.

By means of the ball sockets 13 and 15, the driving device can be connected in an articulated manner to a stationary body part of a motor vehicle and to a movable structural component part of the motor vehicle such as a hatch.

The sensor assembly 4 is penetrated coaxially by a driveshaft 23 which is mounted so as to be rotatable around an axis of rotation 29 and which can be rotatably driven by the electric motor 2 by means of the gear unit 3 and through which this rotational movement can be transmitted to the threaded spindle 6 by the spindle adapter 5.

The sensor assembly 4 can be arranged preassembled in a cylindrical housing with a housing cup 25 that can be closed by a housing cover 24.

FIG. 3a shows a first embodiment example of the sensor assembly 4 in which an annular gear 28 formed as an internal gear is supported at the motor-side base 26 of the housing cup 25 by means of a first spacer disk 27. This annular gear 28 is arranged so as to be rotatable on an eccentric cam 31 of the driveshaft 23 by a coaxial bore hole 30 so that the annular gear 28 carries out an eccentric motion during a rotation of the driveshaft 23. The spacer disk 27 can be formed as a raised area at the base 26 of the housing cup 25 rather than as a separate structural component part. The eccentric cam 31 has a through-hole, shown in FIG. 4, having a splined internal profile which cooperates with a splined external profile 53 on the driveshaft 23.

To prevent the annular gear 28 from being carried along in rotation, two diametrically opposed pins 32 having a circular cross section project axially from the base 26 of the housing cup 25 and protrude into axial bore holes 33 of the annular gear 28. The diameter of the axial bore holes 33 is greater than the diameter of the pins 32 by twice the amount of the eccentricity of the eccentric cam 31.

Accordingly, during a rotation of the driveshaft 23 the annular gear 28 is driven by the eccentric cam 31 in a wobbling motion without rotation.

In the interior of the ring gear 28, a gear wheel 34 formed as an external gear and having a diameter smaller than the inner diameter of the gear 28 is arranged coaxial to the axis of rotation 29. At an area along the circumference, this gear wheel 34 engages the ring gear 28 and forms a reduction gear unit 35 with the gear 28. This engagement area moves during the wobbling motion of the gear 28 and accordingly generates a reduction of the rotational movement of the driveshaft 23 of, e.g., 14:1.

The gear wheel 34 is axially supported by a second spacer disk 36 at the disk part 37 of the annular gear 28 having the coaxial bore hole 30. However, the second spacer disk 36 can also be formed as a raised area at the disk part 37 or wheel 34 rather than as a separate structural component part.

The wheel 34 has a coaxial bore hole 38 into which a sleeve 39 is inserted with frictional engagement. This sleeve 39 is fixed to a carrier 40 which widens radially in the manner of a circular disk. The carrier 40 has a potentiometer wiper 69 with two wiper contact elements 57 and 58 which are connected to one another or are electrically short-circuited.

Figure 3B:
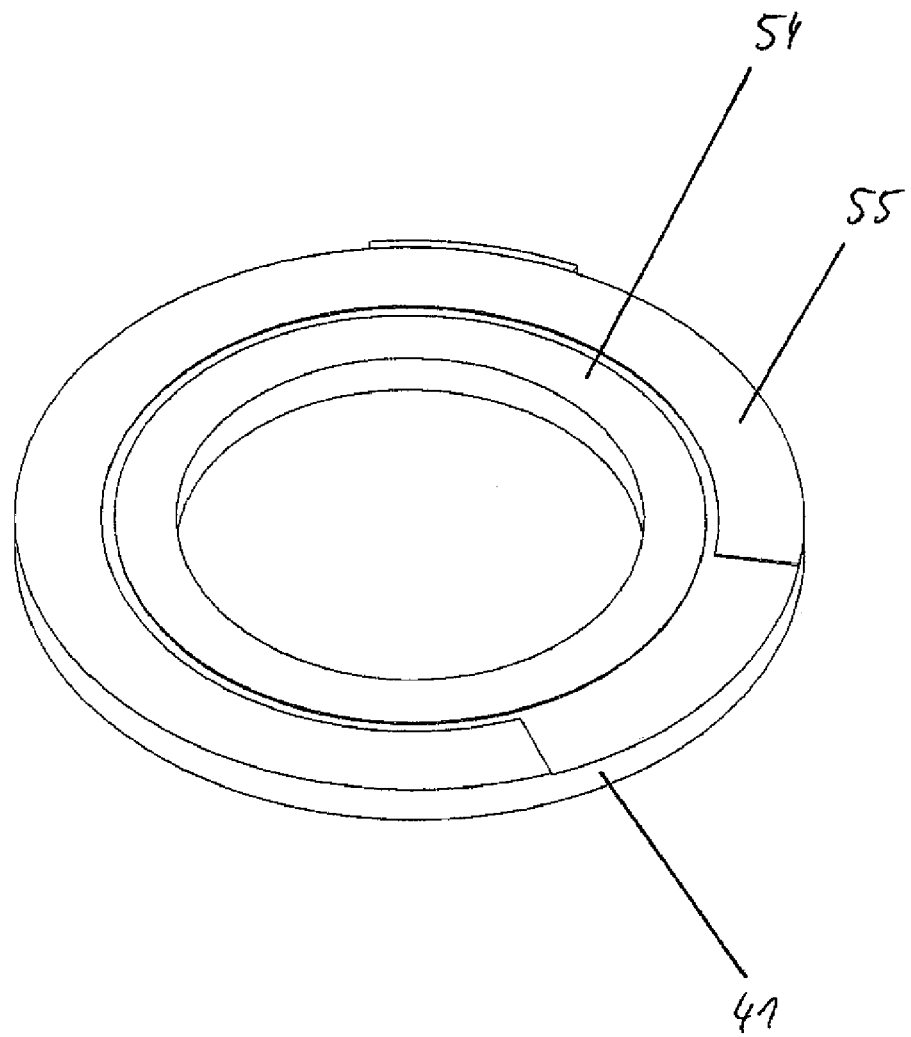

On the side remote of the wheel 34, an annular stationary sensor carrier 41 formed as a plate adjoins the carrier 40 coaxially and, as is shown in FIG. 3b, has on its side facing the carrier 40 a concentric wiper path 54 and a concentric potentiometer path 55 which surrounds the wiper path 54 and forms a potentiometer resistance path.

During a rotation of the carrier 40 which is carried along in rotation by the wheel 34, the respective rotational position of the wheel 34 is picked up via the potentiometer path 55 and a corresponding signal is guided to the line feedthrough and evaluating electronics, not shown, via one of the signal lines 16.

The potentiometer wiper 69 and potentiometer path 55 form a continuous stroke detection sensor, i.e., a voltage signal corresponding to the stroke is present at all times. The movement path of the stroke detection sensor is reduced to less than 360° by the reduction gear unit 35, while the threaded spindle 6 can be driven to multiple rotations by the driveshaft.

Further, an axially projecting stop 43 on the carrier 40 projects into a groove, not shown, on the end face of the sensor carrier 41 on the motor side, which groove extends radially along part of the circumference. The ends of the groove form end stops for the stop 43 and define the adjusting area of the potentiometer wiper 69 and of the potentiometer path 55.

Accordingly, it is possible that the stop 43 need only project into the groove when assembling the sensor assembly 4. A correct positioning of the carrier 40 and sensor carrier 41 relative to one another is then carried out automatically when first put into operation, and the frictional engagement between the sleeve 39 and the coaxial bore hole 38 of the wheel 34 is overcome when the stop 43 stops against one of the end stops, and the carrier 40 with the potentiometer wiper 69 is correctly positioned relative to the wiper path 54 and the potentiometer path 55.

At least one Hall sensor 44 is arranged on a concentric circle on the front side of the sensor carrier 41 axially remote of the electric motor 2, this sensor carrier 41 being formed as a plate. The Hall sensor 44 projects into an axial window 45 of a sensor carrier holder 46 which is carried by the sensor carrier 41. The driveshaft 23 extends through a coaxial through-hole 47.

Further, a plurality of conductor contact connections 59, to which the connection lines 16 shown in FIG. 1 are connected, are arranged on the same side of the sensor carrier 41.

The sensor carrier holder 46 and, the sensor carrier 41 are fixed against rotation relative to housing tube 1.

A magnet ring 48 with a plurality of axially oriented pole pairs located opposite to the Hall sensor 44 are situated coaxially on the side of the sensor carrier holder 46 remote of the carrier 40.

The magnet ring 48 has a coaxial hexagonal opening 49 into which a corresponding hexagon 50 of the eccentric cam 31 projects so that the magnet ring 48 is rotatably driven by the driveshaft 23 at the rotating speed of the latter.

This rotational movement can be detected by the Hall sensor 44 which forms a spindle sensor with the pole pairs, and corresponding signals can be supplied to the evaluating electronics by an additional signal line 16 through the line feedthrough 17.

The magnet ring 48 is supported axially at the housing cover 24 by an elastic O-ring 51 so that the parts of the sensor assembly 4 which are in a sandwich-like arrangement relative to one another are held in the housing without play.

The housing cover 24 has a plurality of catch arms 52 which are arranged so as to be uniformly distributed at its outer circumference and project axially toward the housing cup 25. In the assembled state of the housing, the catch arms 52 engage behind the outer edge of the base 26 of the housing cup 25 by catches arranged at their free ends.

Figure 4:
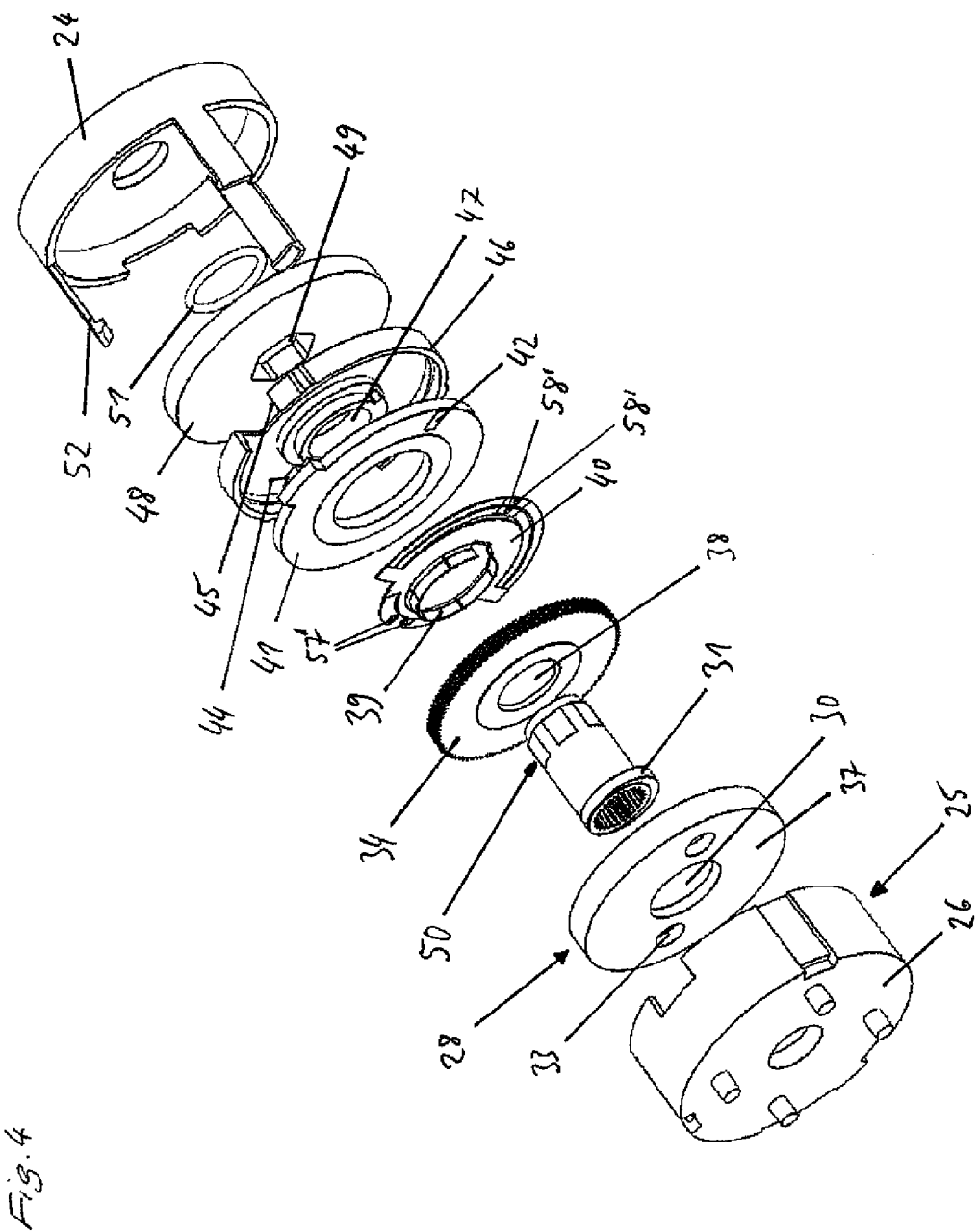
FIG. 4 shows a perspective exploded view of an alternative embodiment form of the sensor unit of the driving device according to FIG. 1.

FIG. 4 shows another embodiment form of the invention which differs from that shown in FIG. 3a in that the potentiometer path is replaced by a contact element 42. Further, an alternative construction of the carrier 40 with spherical cap-shaped wiper contact points 57' and 58' is shown.

When the wiper contact point 58' reaches the contact element 42 during the rotational movement of the carrier 40, where contact element 42 preferably defines the run-out position of the driving device, a corresponding signal is supplied to the evaluating electronics by means of one of the signal lines 16 through a line feedthrough 17.

Figure 5:
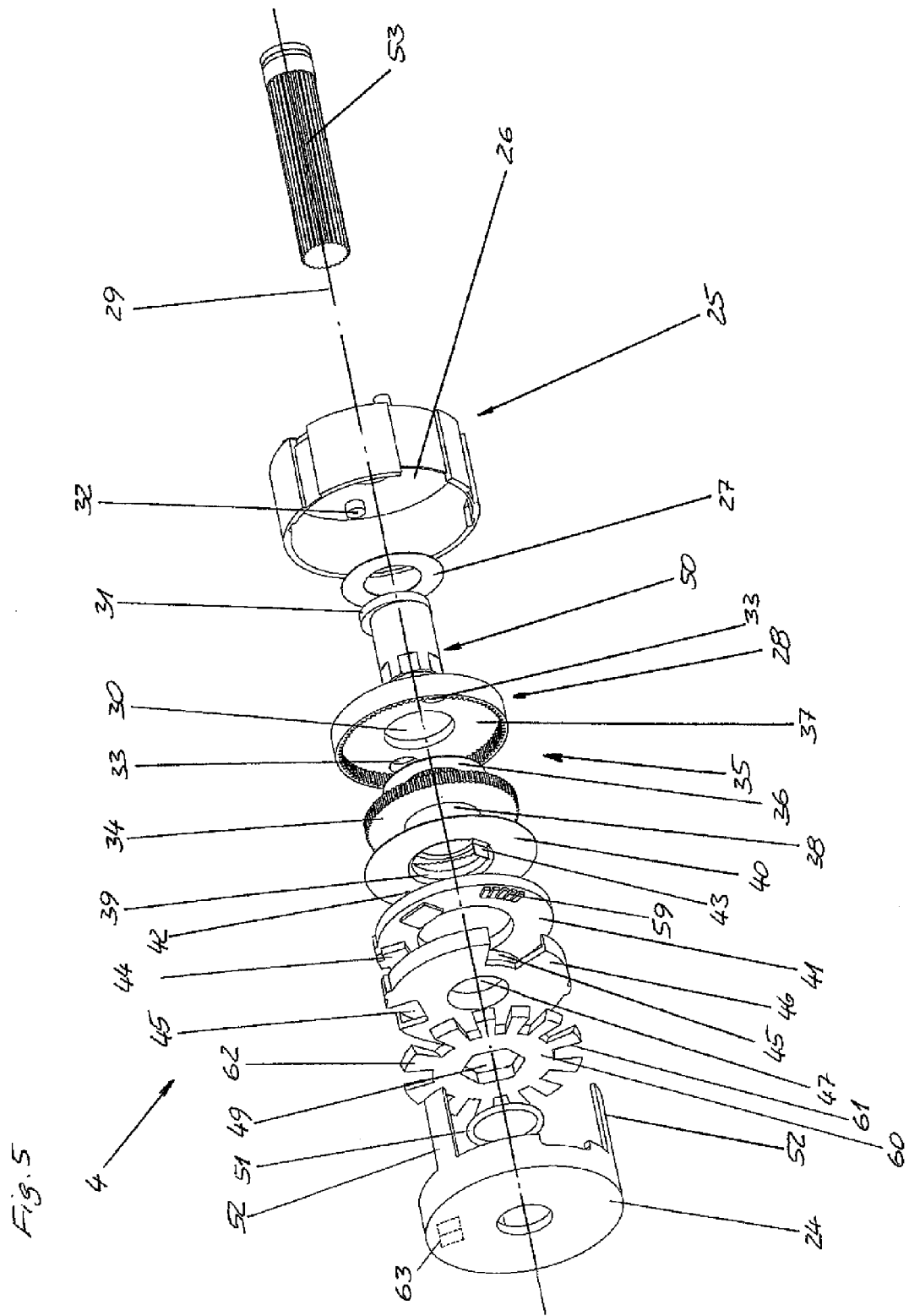
FIG. 5 shows a perspective exploded view of another embodiment form of the sensor unit of the driving device according to FIG. 1.

FIG. 5 shows an alternative embodiment in which the magnet ring is replaced by a fan-type washer 60 which is preferably made of ferromagnetic material. Radial projections 62 are formed at the fan-type washer 60 between radial notches 61. A magnet 63, shown by dashed lines, which is associated with the Hall sensor 44 and cooperates with the latter is arranged in the housing cover. The magnet 63 is arranged across from the Hall sensor 44, but a defined offset can also be provided so that the magnet 63 does not lie exactly opposite to the Hall sensor 44. A magnetic flux is sensed by the Hall sensor 44 and is correspondingly changed by the fan-type washer 60 and leads to a state change in the Hall output.

Figure 6:
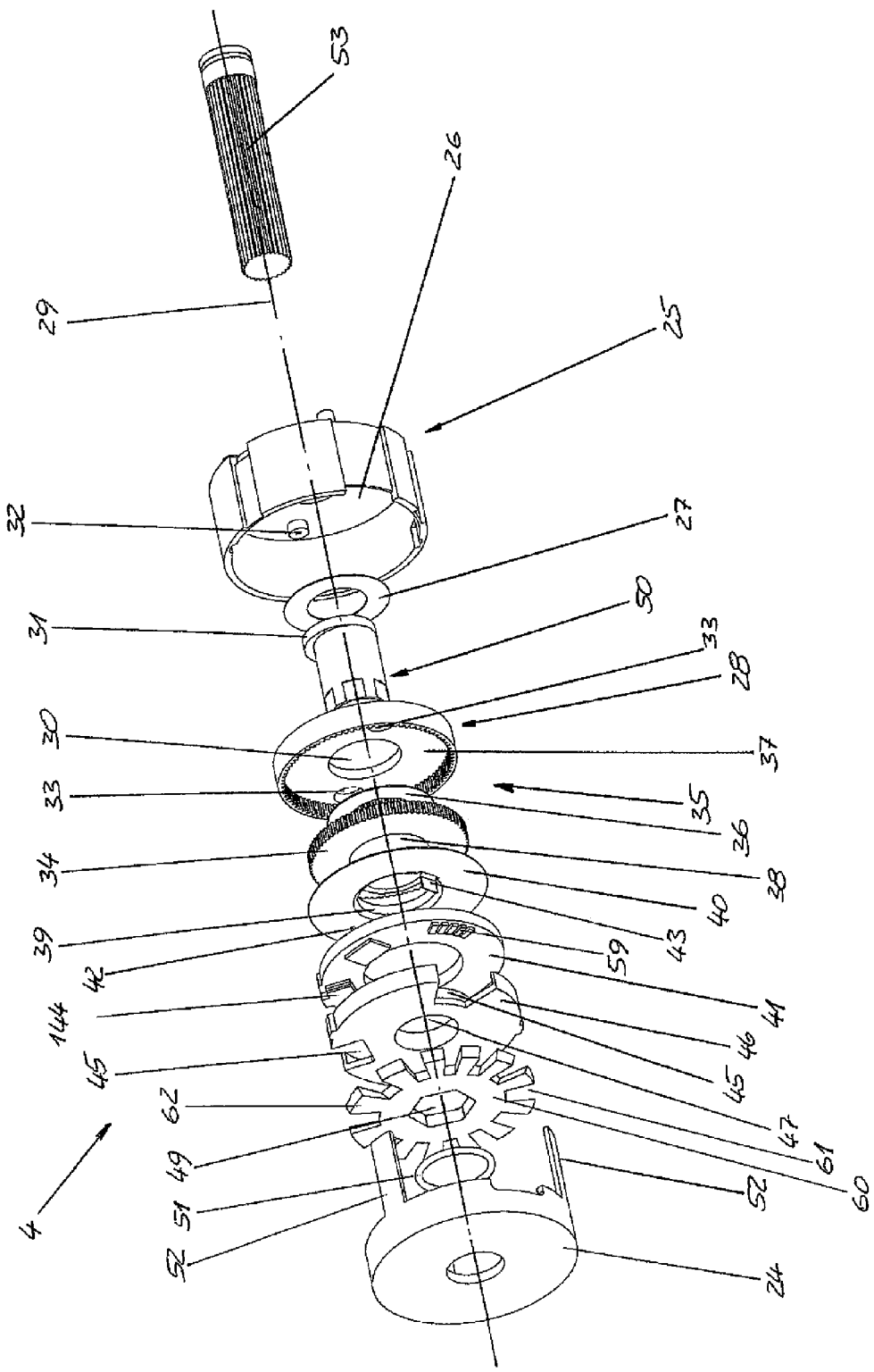
FIG. 6 shows a perspective exploded view of another embodiment form of the sensor unit of the driving device according to FIG. 1.

FIG. 6 shows another embodiment in which the Hall sensor 44 is replaced by a biased Hall sensor 144. In this case, the fan-type washer 60 is sensed like a toothed wheel. The rotating fan-type washer 60 leads to the change in magnetic flux and the state change in the Hall output. The construction of the biased Hall sensor 144 is also shown schematically in FIG. 9.

Figure 7:
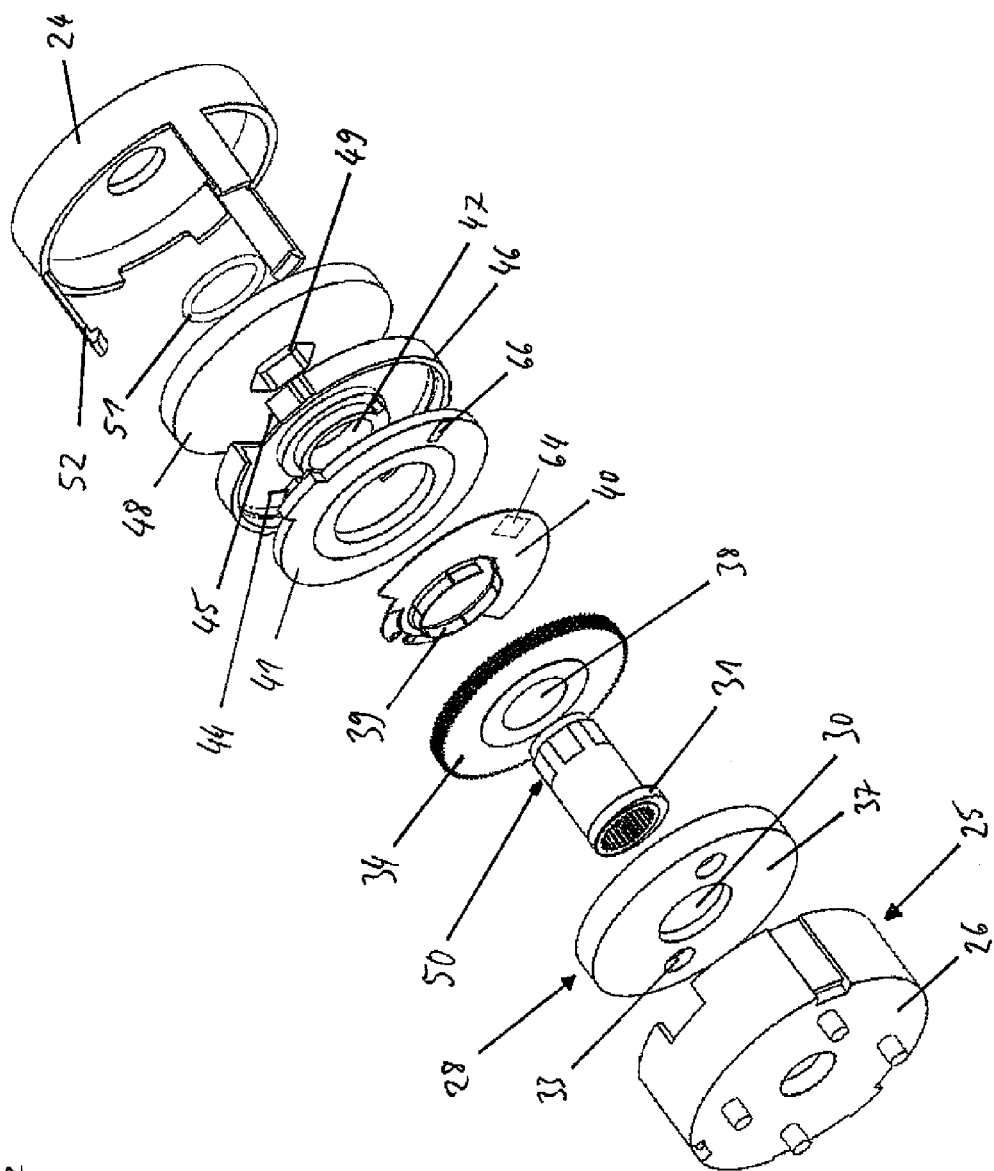
FIG. 7 shows a perspective exploded view of another embodiment form of the sensor unit of the driving device according to FIG. 1.

FIG. 7 shows another variant of the sensor assembly 4. A magnet 64 which cooperates with a reed contact 65 (FIG. 11) is arranged on the carrier 40. A window 66 is arranged in the sensor carrier 41, the reed contact 65 being arranged above the window 66 on the side remote of the motor 2. The reed contact 65 is actuated by the rotating magnet 64.

Figure 8:
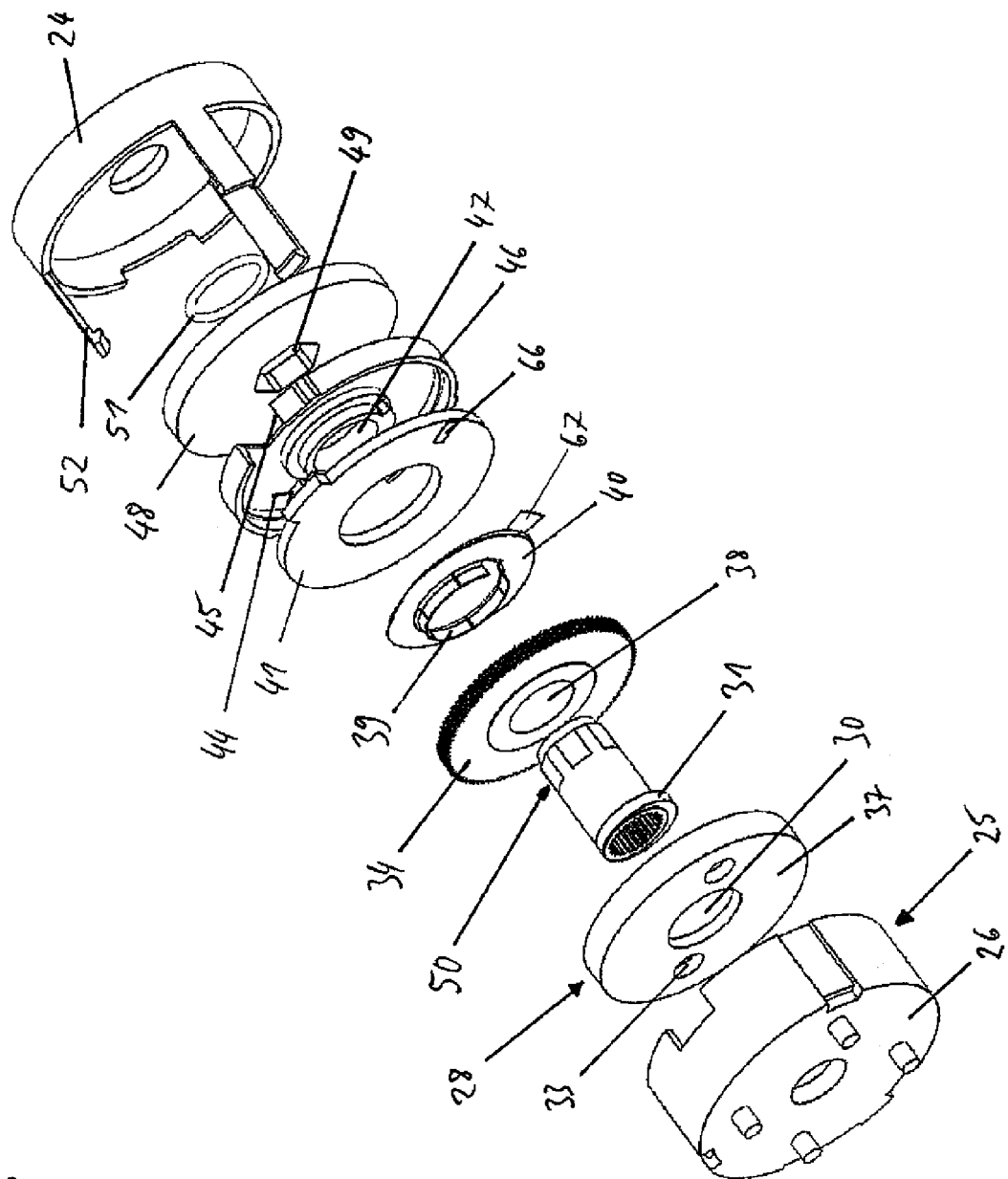
FIG. 8 shows a perspective exploded view of another embodiment form of the sensor unit of the driving device according to FIG. 1.

FIG. 8 shows another embodiment form of the sensor assembly 4. The carrier 40 has a lug 67 which projects out radially and which cooperates with a reed contact arranged behind the window 66 so as to be biased and is arranged on the side of the sensor carrier 41 remote of the motor 2.

Figure 9:
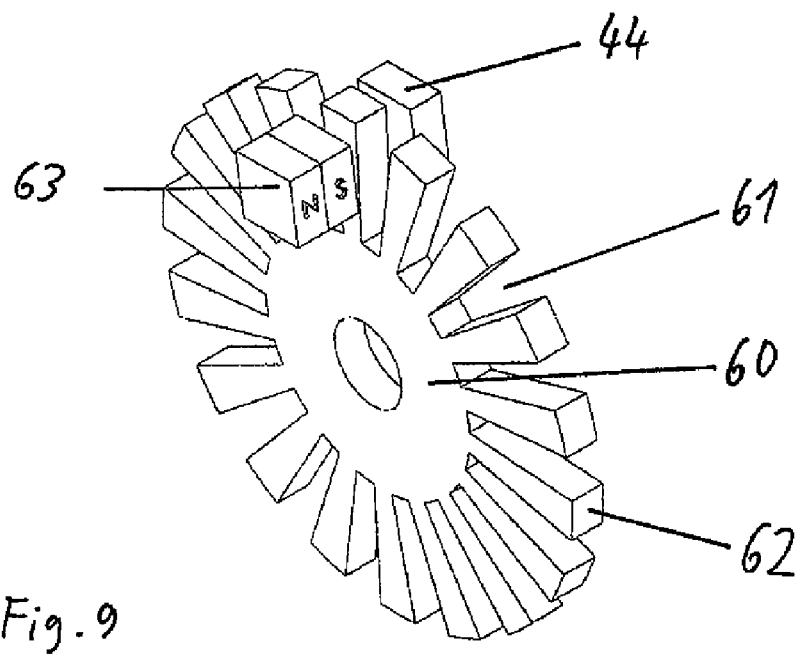
FIG. 9 shows a detailed view of the sensor assembly shown in FIG. 5.

The arrangement of the magnet 63 and the Hall sensor 44 relative to the fan-type washer 60 as was described already referring to FIG. 5 is shown schematically in FIG. 9.

Figure 10:
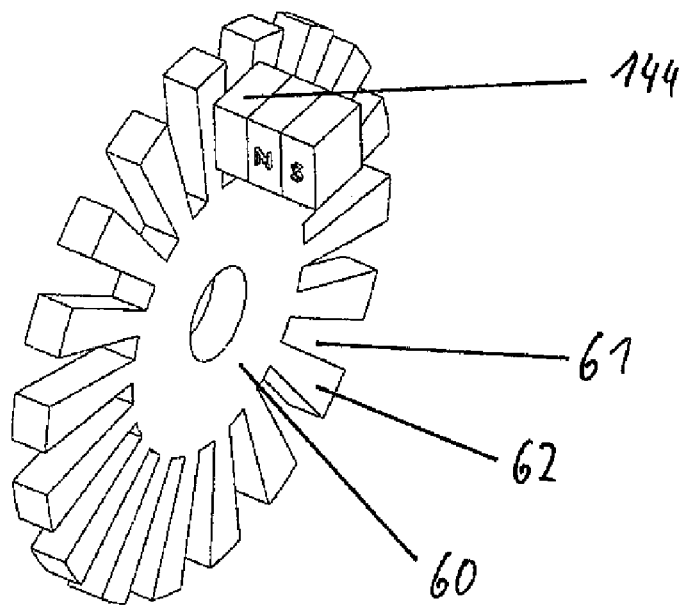
FIG. 10 shows a detailed view of the sensor assembly shown in FIG. 6.

The arrangement of the biased Hall sensor 144 relative to the fan-type washer 60 as was described referring to FIG. 6 is shown schematically in FIG. 10.

Figure 11:
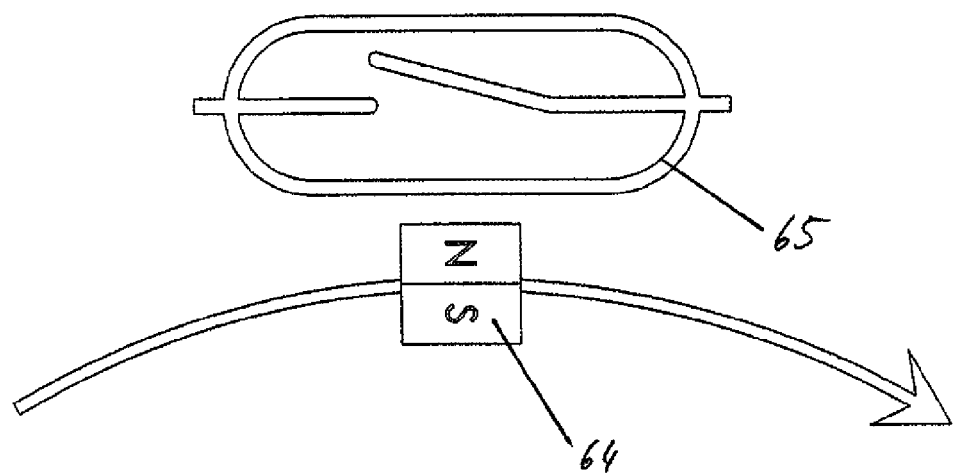
FIG. 11 shows a schematic detailed view of the sensor assembly shown in FIG. 6.

The arrangement of the magnet 64 relative to the reed contact 65 as was described referring to FIG. 7 is shown schematically in FIG. 11.

Figure 12:
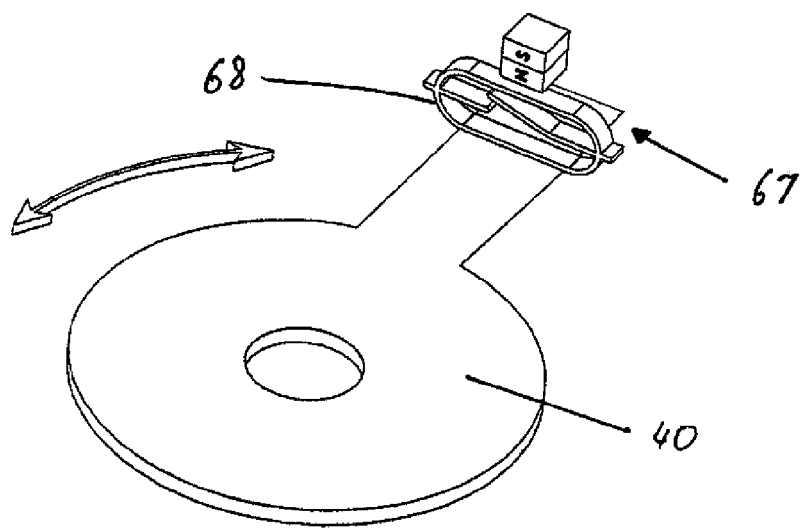
FIG. 12 shows a schematic detailed view of the sensor assembly shown in FIG. 8.

The arrangement of the lug 67 of the carrier 40 relative to the reed contact 68 which was described referring to FIG. 8 is shown schematically in FIG. 12.

The invention is not limited by the embodiments described above which are presented as examples only but can be modified in various ways within the scope of protection defined by the appended patent claims.

We claim:

1. A driving device for a hatch in a motor vehicle, the device comprising:
    a first fastening element which can be connected to a stationary structural component;
    a second fastening element which can be connected to a movable structural component;
    a spindle drive comprising a threaded spindle having an axis of rotation and a spindle nut arranged on the threaded spindle;
    a rotary drive comprising a driveshaft for rotating said spindle about said axis of rotation to move the second fastening element axially relative to the first fastening element;
    a spindle sensor for detecting revolutions of the spindle;
    a stroke detection sensor for continuously detecting the position of the movable structural component, the stroke detection sensor comprising a rotatable sensor element driven in rotation by the driveshaft and a stationary sensor element for continuously detecting the rotational position of the rotatable sensor element; and
    a gear reduction unit between the driveshaft and the rotatable sensor element.

2. The driving device of claim 1 wherein the gear reduction unit comprises:
    an annular gear which is fixed against substantial rotation, the annular gear having an inside diameter;
    an eccentric cam fixed to the driveshaft for driving the annular gear to wobble;
    a gear wheel having an external diameter which is smaller than the inner diameter of the annular gear, wherein the gear wheel engages the annular gear so that the gear wheel rotates less than the drive shaft, wherein the rotatable sensor element is driven to rotate by the gear wheel.

3. The driving device of claim 2 wherein the spindle sensor comprises a magnet ring fixed to the driveshaft, the stroke detection sensor comprising a stationary carrier for the stationary sensor element and a rotatable carrier for the rotatable sensor element, the driving device further comprising a cup-shaped housing containing the magnet ring and the carriers in a sandwich structure.

4. The driving device of claim 2 wherein the annular gear has a plurality of bore holes with a diameter, each bore hole receiving a stationary pin having a diameter, wherein the diameter of the bore holes is larger than the diameter of the pins by twice the eccentricity of the eccentric cam.

5. The driving device of claim 2 wherein the annular gear has internal teeth and the gear wheel has external gear which engage the internal teeth.

6. The driving device of claim 2 wherein the rotatable sensor element has an axially projecting stop and the stationary sensor element has a groove which receives said stop, the groove having circumferential ends which limit the range of rotation of the rotatable sensor element relative to the stationary sensor element.

7. The driving device of claim 6 wherein the rotatable sensor element engages the gear wheel frictionally and is rotationally movable relative to the gear wheel.

8. The driving device of claim 7 further comprising a carrier on which the rotatable sensor element and the axially projecting stop are arranged, the carrier having a sleeve which is concentric to the axis of rotation, the gear wheel having a central hole which frictionally engages the sleeve.

9. The driving device of claim 1 further comprising an annular carrier disk on which the stationary sensor element is arranged.

10. The driving device of claim 1 further comprising a second rotatable sensor element driven in rotation by the driveshaft via the gear reduction unit, and a second stationary sensor element for detecting the rotational position of the second rotatable sensor element.

11. The driving device of claim 10 wherein the rotatable sensor element and the second rotatable sensor element are arranged on a common carrier.

12. The driving device of claim 10 wherein the stationary sensor element and the second stationary sensor element are arranged on a common carrier.

13. The driving device of claim 10 wherein the second rotatable sensor element is a wiper contact and the second stationary contact element is a contact element.

14. The driving device of claim 1 wherein the rotatable position sensor comprises a magnet and the stationary sensor element comprises a reed contact.

15. The driving device of claim 14 further comprising a stationary carrier having a window in which the reed contact is arranged.

16. The driving device of claim 1 further comprising a rotatable carrier having a lug which serves as the rotatable sensor element, the stationary sensor element comprising a biased reed contact.

17. The driving device of claim 16 further comprising a stationary sensor carrier having a window, the biased reed contact being arranged in the window.

18. The driving device of claim 1 wherein the spindle sensor comprises at least one stationary Hall sensor and a magnet ring fixed to the drive shaft adjacent to the at least one Hall sensor.

19. The driving device of claim 1 wherein the spindle sensor comprises at least one stationary Hall sensor, a stationary magnet arranged opposite the at least one Hall sensor, and a fan washer fixed to the driveshaft and arranged between the at least one Hall sensor and the magnet.

20. The driving device of claim 1 further comprising a housing containing the spindle sensor, the stroke detection sensor, and the gear reduction unit so as to form a structural unit penetrated by the driveshaft.

21. The driving device of claim 1 further comprising a coupling between the rotary drive and the spindle, wherein the coupling can be opened.

22. The driving device of claim 1 further comprising a gear unit between the rotary drive and the spindle.

23. The driving device of claim 22 further comprising a housing tube in which the rotary drive and the gear unit are arranged.

24. A driving device for a hatch in a motor vehicle, the device comprising:
  a first fastening element which can be connected to a stationary structural component;
  a second fastening element which can be connected to a movable structural component;
  a spindle drive comprising a threaded spindle having an axis of rotation and a spindle nut arranged on the threaded spindle;
  a rotary drive comprising a driveshaft for rotating said spindle about said axis of rotation to move the second fastening element axially relative to the first fastening element;
  a spindle sensor for detecting revolutions of the spindle;
  a stroke detection sensor for continuously detecting the position of the movable structural component, the stroke detection sensor comprising a rotatable sensor element driven in rotation by the driveshaft and a stationary sensor element for continuously detecting the rotational position of the rotatable sensor element; and
  a gear reduction unit between the driveshaft and the rotatable sensor element,
  wherein the stroke detection sensor is a rotary potentiometer, the rotatable sensor element is a potentiometer wiper, and the stationary sensor element is an annular potentiometer path.

* * * * *